United States Patent
Xu et al.

(10) Patent No.: US 12,194,643 B2
(45) Date of Patent: Jan. 14, 2025

(54) SYSTEM AND METHOD FOR IMPROVING ACCURACY OF 3D EYE-TO-HAND COORDINATION OF A ROBOTIC SYSTEM

(71) Applicant: eBots inc., Fremont, CA (US)

(72) Inventors: Zheng Xu, Pleasanton, CA (US); Sabarish Kuduwa Sivanath, San Jose, CA (US); MingDu Kang, Pleasanton, CA (US)

(73) Assignee: eBots Inc., Fremont, CA (US)

( * ) Notice: Subject to any disclaimer, the term of this patent is extended or adjusted under 35 U.S.C. 154(b) by 241 days.

(21) Appl. No.: 17/751,348

(22) Filed: May 23, 2022

(65) Prior Publication Data

US 2022/0395981 A1 Dec. 15, 2022

Related U.S. Application Data

(60) Provisional application No. 63/209,933, filed on Jun. 11, 2021, provisional application No. 63/208,816, filed on Jun. 9, 2021.

(51) Int. Cl.
  B25J 9/16 (2006.01)

(52) U.S. Cl.
  CPC .......... B25J 9/1692 (2013.01); B25J 9/1664 (2013.01); B25J 9/1697 (2013.01)

(58) Field of Classification Search
  CPC ....... B25J 9/1692; B25J 9/1664; B25J 9/1697
  See application file for complete search history.

(56) References Cited

U.S. PATENT DOCUMENTS

| | | | |
|---|---|---|---|
| 2018/0161984 A1* | 6/2018 | Ishige | B25J 9/1697 |
| 2018/0361589 A1* | 12/2018 | Paquin | B25J 9/1697 |
| 2019/0184570 A1* | 6/2019 | Yung | B25J 9/163 |
| 2020/0198145 A1* | 6/2020 | Hsu | B25J 9/1697 |
| 2020/0398435 A1* | 12/2020 | Okura | B25J 9/1671 |
| 2022/0347853 A1* | 11/2022 | Claussen | G06F 30/10 |
| 2022/0357153 A1* | 11/2022 | Konishi | G01B 11/24 |

* cited by examiner

Primary Examiner — Jaime Figueroa
Assistant Examiner — Mohamad O El Sayah
(74) Attorney, Agent, or Firm — Shun Yao; Yao Legal Services, Inc.

(57) ABSTRACT

One embodiment can provide a robotic system. The system can include a machine-vision module, a robotic arm comprising an end-effector, and a robotic controller configured to control movements of the robotic arm to move a component held by the end-effector from an initial pose to a target pose. While controlling the movements of the robotic arm, the robotic controller can be configured to move the component in a plurality of steps. Displacement of the component in each step is less than or equal to a predetermined maximum displacement value.

12 Claims, 7 Drawing Sheets

SYSTEM AND METHOD FOR IMPROVING ACCURACY OF 3D EYE-TO-HAND COORDINATION OF A ROBOTIC SYSTEM

RELATED APPLICATIONS

This claims the benefit of U.S. Provisional Patent Application No. 63/208,816, entitled "SYSTEM AND METHOD FOR CORRECTING AND COMPENSATING ERRORS OF 3D EYE-TO-HAND COORDINATION," by inventors Sabarish Kuduwa Sivanath and Zheng Xu, filed 9 Jun. 2021, and U.S. Provisional Patent Application No. 63/209,933, entitled "SYSTEM AND METHOD FOR IMPROVING ACCURACY OF 3D EYE-TO-HAND COORDINATION OF A ROBOTIC SYSTEM," by inventors Zheng Xu, Sabarish Kuduwa Sivanath, and MingDu Kang, filed 11 Jun. 2021, the disclosures of which are incorporated herein by reference in their entirety for all purposes.

This disclosure is related to U.S. application Ser. No. 17/751,228, entitled "SYSTEM AND METHOD FOR ERROR CORRECTION AND COMPENSATION FOR 3D EYE-TO-HAND COORDINATION," by inventors Sabarish Kuduwa Sivanath and Zheng Xu, filed 23 May 2022, the disclosure of which is incorporated herein by reference in its entirety for all purposes.

BACKGROUND

Field

This disclosure is generally related to a computer vision system for robotic applications. Particularly, this invention relates to a system and method for improving the accuracy of 3D eye-to-hand coordination of a robotic system.

Related Art

Robots have been widely employed and exploited in modern industrial plants, representing particularly important elements in the production flow. The requirements for more flexibility and rapid reconfigurability have driven the advancement of robotic technologies. Positional accuracy and repeatability of industrial robots are fundamental attributes needed to achieve the automatization of flexible manufacturing tasks. The positional accuracy and repeatability of robots can vary significantly within the robot workspace, and vision-guided robotic systems have been introduced to improve the flexibility and accuracy of the robots. Extensive work has been done to improve the accuracy of the machine-vision system with regard to the robotic end-effectors, so-called eye-to-hand coordination. Achieving highly accurate eye-to-hand coordination is a daunting task, particularly in a three-dimensional (3D) space. Positioning or movement errors from robotic arms and end-effectors, measurement errors of the 3D vision, and errors contained in the calibration target can all contribute to overall system errors, limiting the operating accuracy of the robotic system. It can be challenging for a 6-axis robot to achieve sub-millimeter accuracy in its entire working space.

SUMMARY

One embodiment can provide a robotic system. The system can include a machine-vision module, a robotic arm comprising an end-effector, and a robotic controller configured to control movements of the robotic arm to move a component held by the end-effector from an initial pose to a target pose. While controlling the movements of the robotic arm, the robotic controller can be configured to move the component in a plurality of steps. Displacement of the component in each step is less than or equal to a predetermined maximum displacement value.

In a variation on this embodiment, the machine-vision module can be configured to determine, after each step, a current pose of the component.

In further variation, the robotic controller can be configured to determine a next step based on the current pose and the target pose of the component.

In further variation, the machine-vision module can include a plurality of cameras and one or more structured-light projectors, and the cameras can be configured to capture images of a working space of the robotic arm under illumination of the structured-light projectors.

In further variation, while determining the current pose of the component, the machine-vision module can be configured to generate a three-dimensional (3D) point cloud based on the captured images.

In further variation, while determining the current pose of the end-effector, the machine-vision module can be configured to compare surflet pairs associated with the 3D point cloud and surflet pairs associated with a computer-aided design (CAD) model of the component.

In further variation, the robotic system can further include a coordinate-transformation module configured to transform a pose determined by the machine-vision module from a camera-centered coordinate system to a robot-centered coordinate system.

In further variation, the coordinate-transformation module can be further configured to determine a transformation matrix based on a predetermined number of measured poses of a calibration target.

In a variation on this embodiment, the predetermined maximum displacement value is determined based on a level of required positioning accuracy of the robotic system.

One embodiment can provide a method for controlling movements of a robotic arm comprising an end-effector. The method can include determining a target pose of a component held by the end-effector and controlling, by a robotic controller, movements of the robotic arm to move the component from an initial pose to the target pose in a plurality of steps. Displacement of the component in each step is less than or equal to a predetermined maximum displacement value.

DETAILED DESCRIPTION

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

Embodiments described herein solve the technical problem of improvising the accuracy of eye-to-hand coordination of robotic systems. More specifically, to improve the positioning accuracy of an object-on-hand of the robotic arm, a large movement can be divided into a sequence of small steps, with each small step being guided by the 3D machine-vision system. At each small step, the 3D vision system captures images of the work scene and determines, with the assistance of a segmentation neural network, the pose of the object-on-hand. The robotic controller can adjust the motion plan according to the determined pose until the object-on-hand arrives at a destination pose (e.g., a pose that matches the mounting location. In some embodiments, determining the pose of the object-on-hand can involve comparing measured surflets of the object with surflets of a known computer-aided design (CAD) model of the objects.

Eye-to-Hand Coordination Error

Figure 1:
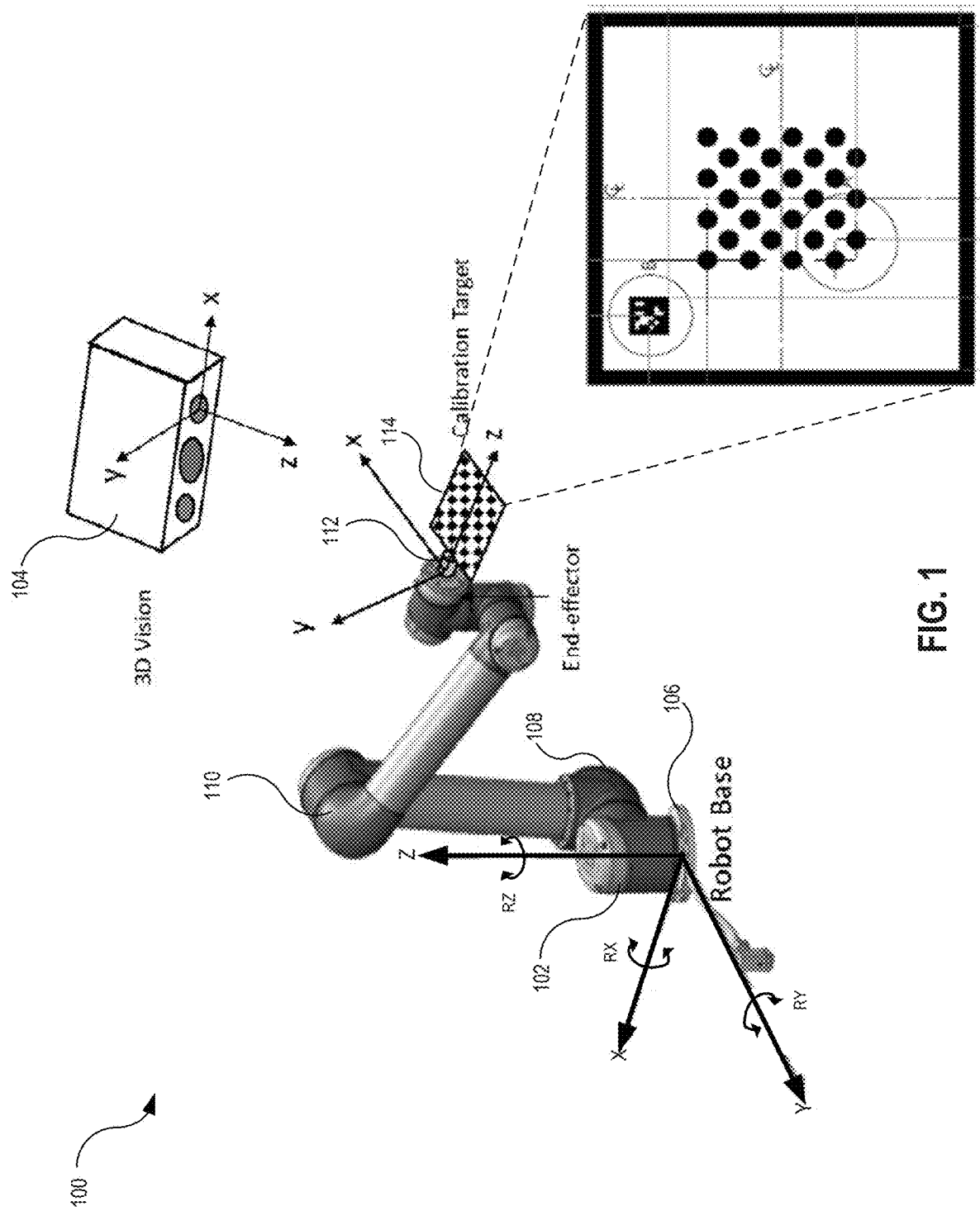
FIG. 1 illustrates an exemplary robotic system, according to one embodiment.

FIG. 1 illustrates an exemplary robotic system, according to one embodiment. Robotic system 100 can include a robotic arm 102 and a 3D machine-vision module 104. In some embodiments, robotic arm 102 can include a base 106, multiple joints (e.g., joints 108 and 110) and a gripper 112. The combination of the multiple joints can enable robotic arm 102 to have an extensive range of movement and have six degrees of freedom (6DoF). FIG. 1 shows the Cartesian coordinate system (e.g., X-Y-Z) used by the robotic controller to control the pose of robotic arm 102. This coordinate system is referred to as the robot-base coordinate system. In the example shown in FIG. 1, the origin of the robot-base coordinate system is at robotic base 106, so this coordinate system is also referred to as a robot-centered coordinate system.

FIG. 1 also shows that 3D machine-vision module 104 (which may include multiple cameras) is configured to capture images of robotic arm 102, including images of a calibration target 114 held by gripper 112. Calibration target 114 typically includes a pre-defined pattern, such as the dot array shown in the amplified view of target 114. Capturing images of calibration target 114 allows 3D machine-vision module 104 to determine the exact location of gripper 112. FIG. 1 also shows the Cartesian coordinate system used by 3D machine-vision system 104 to track the pose of robotic arm 102. This coordinate system is referred to as the camara coordinate system or camera-centered coordinate system. In the example shown in FIG. 1, the origin of the camera coordinate system is located at one of the cameras.

The robotic eye-to-hand coordination refers to the transformation of coordinates from the camera coordinate system to the robot-base coordinate system such that machine vision can be used to guide the movements of the robotic arm. The transformation between the coordinate systems can be expressed as:

$$\vec{V}_r = {}^bH_c \vec{V}_c, \quad (1)$$

where ${}^bH_c$ is the transformation matrix, $\vec{V}_r$ is a vector in the robot-base space (i.e., it is represented using coordinates in the robot-base coordinate system), $\vec{V}_c$ is the vector in camera space (i.e., it is represented using coordinates in the camera coordinate system). Equation (1) can be expanded by expressing each vector using its X, Y, and Z components to obtain:

$$\begin{bmatrix} X_r \\ Y_r \\ Z_r \\ 1 \end{bmatrix} = \begin{bmatrix} R_{11} & R_{12} & R_{13} & T_x \\ R_{21} & R_{22} & R_{23} & T_y \\ R_{31} & R_{32} & R_{33} & T_z \\ 0 & 0 & 0 & 1 \end{bmatrix} \begin{bmatrix} X_c \\ Y_c \\ Z_c \\ 1 \end{bmatrix}, \quad (2)$$

where $X_c$, $Y_c$, $Z_c$ are coordinates in the camera space; $X_r$, $Y_r$, $Z_r$ are the coordinates in the robot-base space; $R_{ij}$ are the rotational coefficients, i=1, 2, 3 and j=1,2,3; and $T_x$, $T_y$, $T_z$ are the translational coefficients.

One can obtain transformation matrix ${}^bH_c$ by performing an eye-to-hand calibration process. During the calibration process, a user can securely mount the robotic arm and the cameras of the 3D machine-vision system and then attach a calibration target (e.g., target 114 shown in FIG. 1) to an end-effector g of the robotic arm. The robotic arm can move end-effector g to a number of planned poses within the field of view (FOV) of the cameras. The robotic controller records the poses of end-effector g with respect to the robot base (i.e., with respect to the origin of the robot-base coordinate system) as ${}^bH_g$, and the 3D machine-vision system records the pose of the calibration target with respect to the camera (i.e., with respect to the origin of the camera coordinate system) as ${}^cH_t$. The poses in the robot-base space and the camera space satisfy the following equation:

$${}^{g(i)}H_b \, {}^bH_c \, {}^cH_{t(i)} = {}^{g(j)}H_b \, {}^bH_c \, {}^cH_{t(j)}, \quad (3)$$

where i and j correspond to poses, ${}^{g(i)}H_b$ and ${}^{g(j)}H_b$ are poses of the robot base with respect to end-effector g (with ${}^{g(i)}H_b = [{}^bH_{g(i)}]^{-1}$ and ${}^{g(j)}H_b = [{}^bH_{g(j)}]^{-1}$; ${}^cH_{t(i)}$ and ${}^cH_{t(j)}$ are poses of the calibration target with respect to the origin in the camera space, and ${}^bH_c$ is the camera pose with respect to the origin of the robot-base space, which is in fact the transformation matrix from the camera space to the robot-base space. In other words, knowing ${}^bH_c$, one can convert the camera-viewed pose of the target to the robot-controller-controlled pose of end-effector g. One can rearrange equation (3) to obtain:

$$[{}^{g(j)}H_b]^{-1} \, {}^{g(i)}H_b \, {}^bH_c = {}^bH_c \, {}^cH_{t(j)} [{}^cH_{t(i)}]^{-1}. \quad (4)$$

Various numerical approaches have been developed to solve equation (4) in order to derive the transformation matrix (${}^bH_c$.) It has been proved that at least three poses (or two pairs of poses) are required to solve equation (4). Linear least squares technique or Singular Vector Decomposition (SVD) can be used to derive the transformation matrix. Lie theory can also be used to derive the transformation matrix by minimizing the distance metric on the Euclidean group. More specifically, a least square fitting can be introduced to obtain the solution for the transformation matrix using the canonical coordinates for Lie groups. Additional approaches can include using quaternion and non-linear minimization to improve the robustness of the solution, using the Kronecker product and vectorization to improve the robustness in case of small rotation angles, and implementing dual quaternion and simultaneous solution for rotation and translation using SVD to improve the accuracy of the transformation matrix.

Although the above approaches have been shown to improve the accuracy of the transformation matrix, due to the non-linearity of kinematics and the inherent nature of numerical computations, there can still be errors. Moreover, input data from the robotic controller and cameras may also include errors, which can cause inevitable errors in the transformation matrix. For example, errors in rotational coefficients $\Delta R_{ij}$ are above $10^{-3}$ in current robotic systems. Errors in the transformation matrix can lead to positioning/pose errors of the robot.

The error of eye-to-hand coordination can be determined by:

$$\Delta \vec{V}_r = \Delta[^b H_c] \vec{V}_c + {}^b H_c \Delta \vec{V}_c, \quad (5)$$

where $\Delta \vec{V}_r$ is the error in the robot-base space, $\Delta \vec{V}_c$ is the measurement error in the camera space, and $\Delta[^b H_c]$ is the error included in the transformation matrix.

Equation (5) can be expanded as follows:

$$\begin{bmatrix} \Delta X_r \\ \Delta Y_r \\ \Delta Z_r \end{bmatrix} = \begin{bmatrix} \Delta R_{11} & \Delta R_{12} & \Delta R_{13} & \Delta T_x \\ \Delta R_{21} & \Delta R_{22} & \Delta R_{23} & \Delta T_y \\ \Delta R_{31} & \Delta R_{32} & \Delta R_{33} & \Delta T_z \end{bmatrix} \begin{bmatrix} X_c \\ Y_c \\ Z_c \\ 1 \end{bmatrix} + \begin{bmatrix} R_{11} & R_{12} & R_{13} & T_x \\ R_{21} & R_{22} & R_{23} & T_y \\ R_{31} & R_{32} & R_{33} & T_z \\ 0 & 0 & 0 & 1 \end{bmatrix} \begin{bmatrix} \Delta X_c \\ \Delta Y_c \\ \Delta Z_c \\ 0 \end{bmatrix}, \quad (6)$$

wherein $[\Delta X_r \, \Delta Y_r \, \Delta Z_r]^T$ is the position error in the robot-base space, $[\Delta X_c \, \Delta Y_c \, \Delta Z_c \, 0]^T$ is the measurement error in the camera space, and $[X_c \, Y_c \, Z_c \, 1]^T$ is the actual position of the object in the camera space.

It can be seen from equation (6) that the positioning error of the object in the robot-base space (i.e., $[\Delta X, \Delta Y, \Delta Z_r]^T$) is proportional to the displacement of the object in the camera space (i.e., $[X_c \, Y_c \, Z_c \, 1]^T$) or the distance between the object and the original in the camera space. Therefore, it is inevitable that the error of eye-to-hand coordination increases with the distance between the object-on-hand and the camera, i.e., the distance from the eye (the camera) to the hand (the object-on-hand) is the dominant factor of error.

When the object-on-hand is moved from $R_1$ and $R_2$ in the robot-base space, correspondingly, in the camera space (or within the FOV of the 3D vision system), the object-on-hand is moved from $C_1$ and $C_2$. The displacement of the object in the robot-base space is denoted $\vec{R} = \vec{R}_2 - \vec{R}_1$, and the displacement of the object in the camera space is denoted $\vec{C} = \vec{C}_2 - \vec{C}_1$, where:

$$\vec{R}_2 = {}^b H_c \vec{R}_2, \quad (7.1)$$

$$\vec{R}_1 = {}^b H_c \vec{R}_1, \text{ and} \quad (7.2)$$

$$\vec{R} = \vec{R}_2 - \vec{R}_1 = {}^b H_c (\vec{C}_2 - \vec{C}_1) = {}^b H_c \vec{C}. \quad (7.3)$$

Accordingly, the positioning error of the object can be determined by:

$$\Delta \vec{R} = \Delta[^b H_c] \vec{C} + {}^b H_c \Delta \vec{C}. \quad (8)$$

As can be seen from equation (8), with small steps, the positioning error can be determined by the transformation matrix (i.e., $^b H_c$), changes in the transformation matrix (i.e., $\Delta[^b H_c]$), the displacement of the object in the camera space (i.e., $\vec{C}$), and changes in $\vec{C}$ (i.e., $\Delta \vec{C}$). Note that the absolute distance from the camera to the object is eliminated. Equation (8) can be expanded as follows:

$$\begin{bmatrix} \Delta x_r \\ \Delta y_r \\ \Delta z_r \end{bmatrix} = \begin{bmatrix} \Delta R_{11} & \Delta R_{12} & \Delta R_{13} & \Delta T_x \\ \Delta R_{21} & \Delta R_{22} & \Delta R_{23} & \Delta T_y \\ \Delta R_{31} & \Delta R_{32} & \Delta R_{33} & \Delta T_z \end{bmatrix} \begin{bmatrix} x_c \\ y_c \\ z_c \\ 1 \end{bmatrix} + \begin{bmatrix} R_{11} & R_{12} & R_{13} & T_x \\ R_{21} & R_{22} & R_{23} & T_y \\ R_{31} & R_{32} & R_{33} & T_z \\ 0 & 0 & 0 & 1 \end{bmatrix} \begin{bmatrix} \Delta x_c \\ \Delta y_c \\ \Delta z_c \\ 0 \end{bmatrix}. \quad (9)$$

In real-life applications, changes of the rotational coefficients (i.e., $\Delta R_{ij}$ may be in the range of $2e^{-3}$, and $R_{ij}$ can be in the range of $e^{-2}$. Therefore, if the relative motion in the camera space $[x_c \, y_c \, z_c \, 1]^T$ can be controlled to be within the range between 5 and 10 mm and $[\Delta x_c \, \Delta y_c \, \Delta z_c \, 0]^T$ can be approximately 50 then the positioning error $[\Delta x_r \, \Delta y_r \, \Delta z_r]^T$ can be controlled to be within 100 μm, which is sufficient to meet the requirements of automated assembly of consumer electronics.

Small-Step Robotic Motion

In some embodiments, to improve the positioning accuracy of an object, the movement of the object can be divided into a number of small steps, with the movement of the object in each small step confined to a predetermined small range (e.g., the aforementioned 5-10 mm range). Note that the object can be the end-effector of the robotic arm or an object held by the end-effector, and it can be referred to as an object-on-hand. At each small step, subsequent to the movement of the object, the 3D machine-vision system can determine the actual position of the object and adjusts the motion plan for the next small step, until the object arrives at the destination pose.

Figure 2:
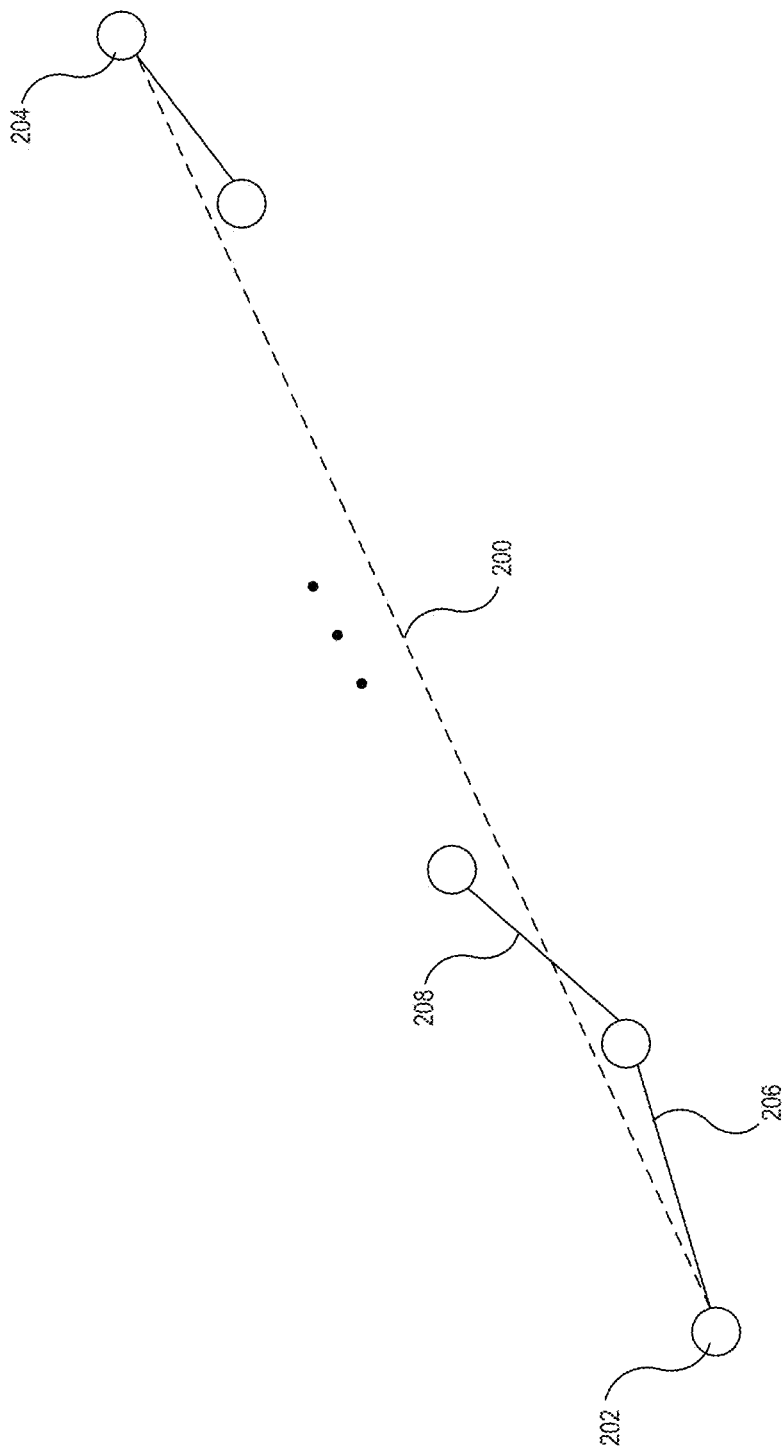
FIG. 2 illustrates an exemplary trace of an object-on-hand, according to one embodiment.

FIG. 2 illustrates an exemplary trace of an object-on-hand, according to one embodiment. Note that for simplicity of illustration, only the displacement, not the 3D pose, of the object-on-hand is shown. In FIG. 2, an object is to be moved, by the robotic arm, from a starting position 202 to an ending position 204. The distance between starting position 202 and ending position 204 is greater than a predetermined maximum displacement. Note that the value of the maximum displacement can depend on the desired positioning accuracy. The higher the desired accuracy is, the lower the value of the maximum displacement is. In some embodiments, sub-millimeter positioning accuracy is required, and the maximum displacement value can be between 5 and 10 mm.

FIG. 2 shows that, instead of moving the object in one step following a direct path 200, the robotic arm moves the object in a number of small steps, e.g., steps 206 and 208. The displacement of the object in each step can be equal to or less than the predetermined maximum displacement. The small step can ensure that the positioning amount resulting from errors in the transformation matrix can be kept small, and the actual path taken by the object may not diverge significantly from direct path 200. For illustration purposes, the path divergence is exaggerated in FIG. 2.

The way the robotic arm moves the object to a destination pose using a sequence of small steps and adjusting, at each step, the path based on visual feedback can be similar to the way a human performs a movement that requires accurate hand positioning (e.g., threading a needle). Like a human who relies on the eyes to determine the current poses of the needle and thread in order to adjust the hand movement, the robot relies on its eyes (e.g., the 3D machine-vision system) to determine the actual pose of the object at each small step.

Note that there can be multiple objects within the working space, and the machine-vision system may need to determine the poses of the multiple objects in order to guide the robotic arm to move an object from one pose to the other.

In some embodiments, the 3D machine-vision system can include two vision modules, with each vision module including two cameras and a structured-light projector. One of the two vision modules can be mounted directly above the working space, whereas the other vision module can be mounted at an angle. Detailed descriptions of the 3D machine-vision system can be found in PCT Application No. PCT/US2020/043105, entitled "SYSTEM AND METHOD FOR 3D POSE MEASUREMENT WITH HIGH PRECISION AND REAL-TIME OBJECT TRACING," by inventors MingDu Kang, Kai C. Yung, Wing Tsui, and Zheng Xu, filed 22 Jul. 2020, the disclosure of which is incorporated herein by reference in its entirety.

To identify an object in the working space, the 3D machine-vision system can control all four cameras to capture one image of the working space and send the images to an instance-segmentation neural network to better understand the scene. In some embodiments, the instant-segmentation neural network can generate both a semantic map (which classifies whether each pixel belongs to the background or an object) and an instance center for each object. Based on the semantic map and the instance centers, the 3D machine-vision system can identify what objects are in the scene and generate a mask for each object.

Subsequently, the 3D machine-vision system can control the structured-light projectors to project patterns onto the objects and control the cameras to capture images of the objects under the illumination of the structured light. The captured images can be used to construct a 3D point cloud of the environment. More specifically, constructing the 3D point cloud can include generating a decode map based on the projected images of the structured-light projector, associating camera pixels with projector pixels, and triangulating 3D points, based on the camera-and-projector intrinsic matrix, the relative position between the cameras and projectors, and the camera-projector pixel associations.

When there are multiple objects in the working space (or specifically in the FOV of the 3D machine-vision system), based on the mask generated from the instance-segmentation neural network, the 3D machine-vision system can isolate an object of interest and generate a 3D point cloud for that object.

In some embodiments, the 3D pose of an object in the FOV of the machine-vision system can be estimated or determined using a surflet-based template-matching technique. A surflet refers to an oriented point on the surface of a 3D object. Each surflet can be described as a pair (p, n), where p is the position vector and n is the surface normal. Surflet-pair relations can be viewed as a generalization of curvatures. A surflet pair can be expressed using a vector:

$$\vec{s}(\vec{n}_1, \vec{p}_2, \vec{p}_1, \vec{n}_2) = (\|\vec{d}\|_2, \angle(\vec{n}_1, \vec{d}), \angle(\hat{n}_2, \vec{d}), \angle(\vec{n}_1, \vec{n}_2)), \quad (10)$$

wherein $\vec{p}_1$, $\vec{p}_2$ are 3D position vectors of the surface points, $\vec{n}_1$, $\vec{n}_1$ are vectors normal to the surface, and $\vec{d}$ is the distance vector from $\vec{p}_1$ to $\vec{p}_2$.

The surflet-based template-matching technique is based on a known CAD model of the object. In some embodiments, a number of surflet pairs can be extracted from the CAD model of the objects, and the extracted surflet pairs (as expressed using equation (10)) can be stored in a 4D hash map. During operation of the robotic arm, at each small step, the 3D machine-vision system can generate the 3D point cloud of an object and compute surflet pairs based on the 3D point cloud. The surflet pairs of the object are associated with the surflet pairs of the CAD models using the pre-computed hash map, and the 3D pose of the object can be estimated accordingly.

Figure 3:
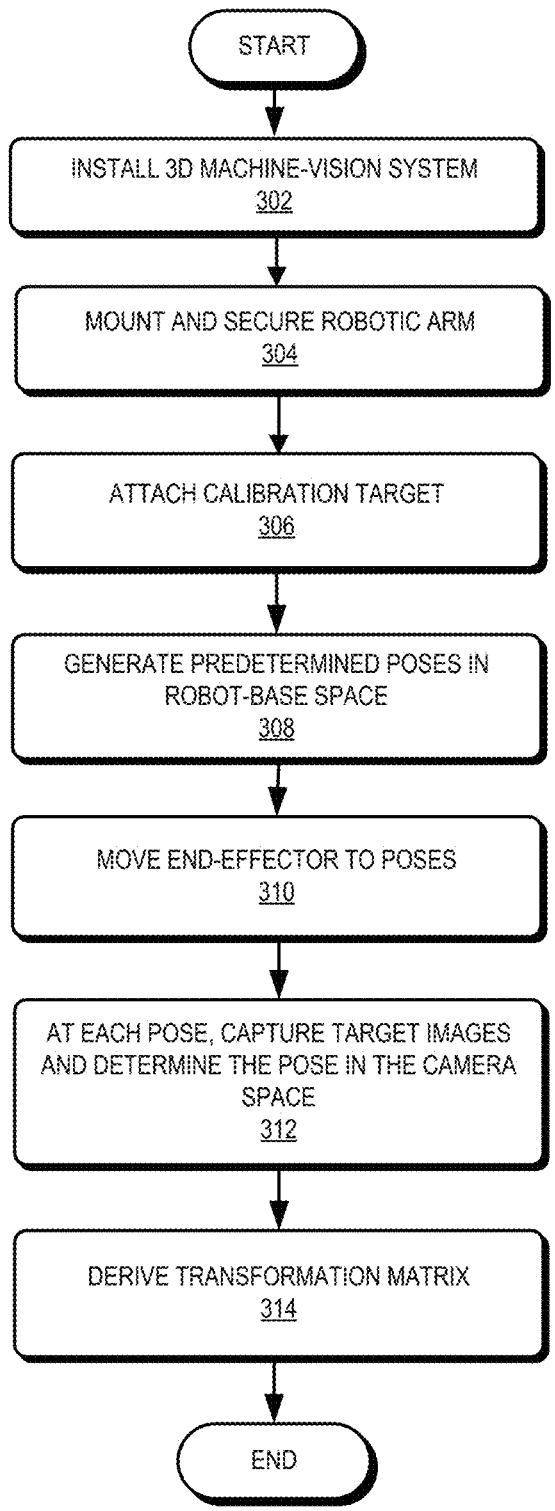
FIG. 3 presents a flowchart illustrating an exemplary process for calibrating the robotic system and obtaining the transformation matrix, according to one embodiment.

Before using the robotic system to accomplish assembly tasks, the robotic system needs to be calibrated, and the transformation matrix needs to be derived. Note that, even though the derived transformation matrix most likely contains errors, such errors only affect the positioning accuracy of the object minimally at each small step. FIG. 3 presents a flowchart illustrating an exemplary process for calibrating the robotic system and obtaining the transformation matrix, according to one embodiment. During operation, the 3D machine-vision system is installed (operation 302). The 3D machine-vision system can include multiple cameras and a structured-light projector. The 3D machine-vision system can be mounted and secured above the end-effector of the robotic arm being calibrated, with the lenses of the cameras and the structured-light projector facing the end-effector of the robotic arm. The robot operator can mount and secure the 6-axis robotic arm, so that the robotic arm's end-effector can move freely to all possible poses within the FOV and depth of view (DOV) of the 3D machine-vision system (operation 304).

For calibration purposes, a calibration target (e.g., target 114 shown in FIG. 1) can be attached to the end-effector (operation 306). The predetermined pattern on the calibration target can facilitate the 3D machine-vision system in determining the pose (which includes not only the location but also the tilt angle) of the end-effector. The surface area of the calibration target is smaller than the FOV of the 3D machine-vision system.

The controller of the robotic arm can generate a number of predetermined poses in the robot-base space (operation 308) and sequentially move the end-effector to those poses (operation 310). At each pose, the 3D machine-vision system can capture images of the calibration target and determine the pose of the calibration target in the camera space (operation 312). The transformation matrix can then be derived based on poses generated in the robot-base space and the machine-vision-determined poses in the camera space (operation 314). Various techniques can be used to determine the transformation matrix. For example, equation (4) can be solved based on the predetermined poses in the robot-base space and the camera space using various techniques, including but not limited to: linear least square or SVD techniques, Lie-theory-based techniques, techniques based on quaternion and non-linear minimization or dual quaternion, techniques based on Kronecker product and vectorization, etc.

After calibration, the robotic system can be used to complete assembly tasks, such as picking up a component in a working space, adjusting the pose of the component, and mounting the component at a mounting location. In some embodiments, the robotic arm moves in small steps, and at each small step, the current pose of the end-effector or component is measured, using the 3D machine-vision system, and the next pose is computed based on the measured pose and the target pose.

Figure 4:
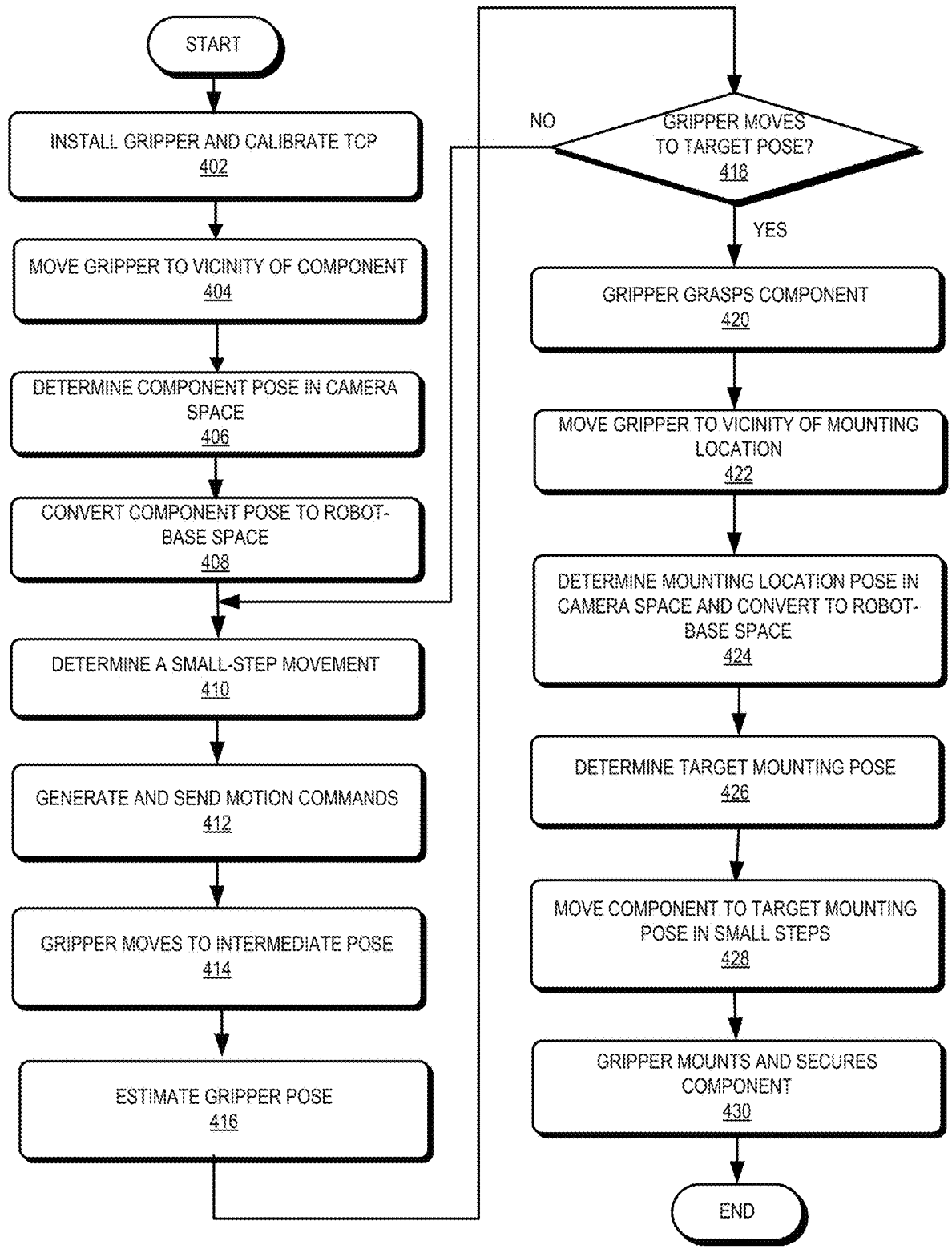
FIG. 4 presents a flowchart illustrating an exemplary operation process of the robotic system, according to one embodiment.

FIG. 4 presents a flowchart illustrating an exemplary operation process of the robotic system, according to one embodiment. The robotic system can include the robotic arm and the 3D machine-vision system. During operation, an operator can install a gripper on the robotic arm and calibrate its TCP (operation 402). The robotic controller can move the gripper to the vicinity of a to-be-assembled component in the working space under the guidance of the 3D machine-vision system (operation 404). At this stage, the 3D machine-vision system may generate low-resolution images (e.g., using a camera with a large FOV) to guide the movement of the gripper. At this stage, the positioning accuracy of the gripper is less critical. For example, the gripper can be moved from its original location to the vicinity of the to-be-assembled component in one large step.

The 3D machine-vision system can determine the pose of the component in the camera space (operation 406). Note that there can be multiple components within the working space, and determining the pose of the to-be-assembled component can involve the steps of identifying that component and generating a 3D point cloud for that component.

Figure 5:
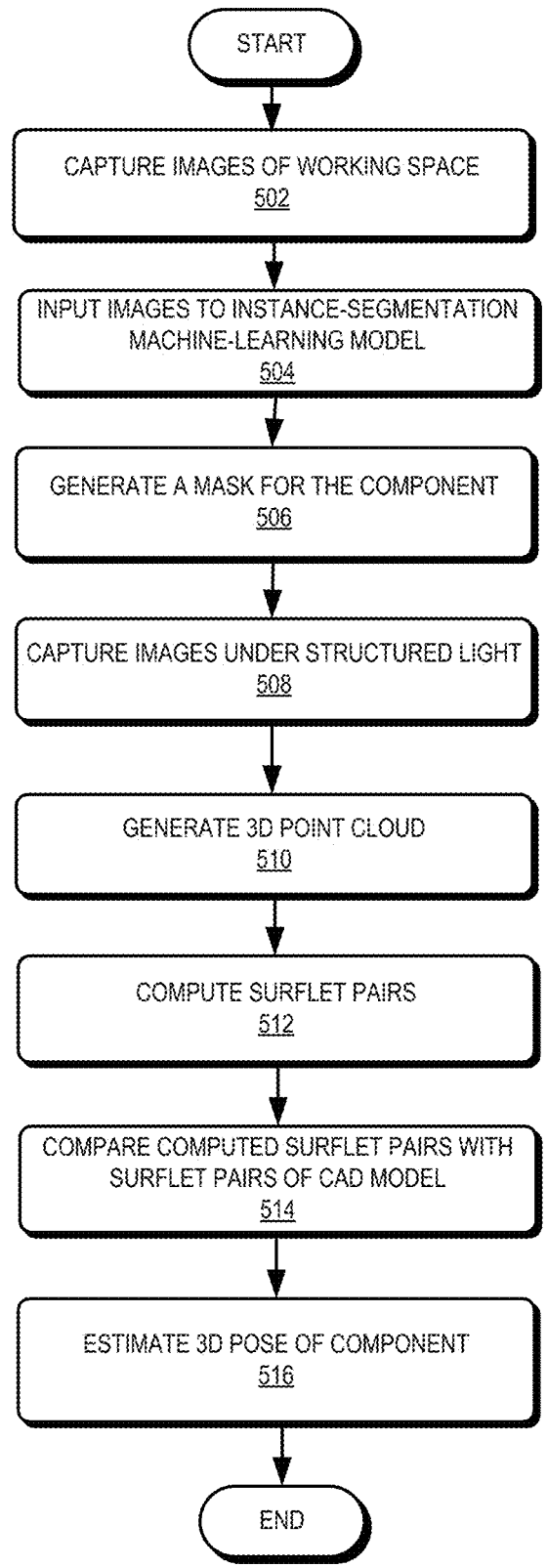
FIG. 5 presents a flowchart illustrating an exemplary process for determining the pose of a component, according to one embodiment.

FIG. 5 presents a flowchart illustrating an exemplary process for determining the pose of a component, according to one embodiment. During operation, the 3D machine-vision system can capture one or more images of the working space (operation 502). The images can be inputted to an instance-segmentation machine-learning model (e.g., a deep-learning neural network), which outputs a semantic map for the scene and an instance center for the component (operation 504). A mask for the object can be generated based on the semantic map and the instance center (operation 506).

The 3D machine-vision system can further capture images of the scene under the illumination of the structured light (operation 508) and generate a 3D point cloud for the component based on the captured images and the mask of the component (operation 510). Note that generating the 3D point cloud may include the steps of generating a decode map based on images captured under the illumination of the structured light and triangulating each 3D point based on the intrinsic matrix of the camera and projector, the relative position between the camera and projection, and the camera-projector pixel association.

The 3D machine-vision system can further compute surflet pairs from the 3D point cloud (operation 512) and compare the computed surflet pairs of the 3D point cloud with the surflet pairs of a 3D CAD model of the component (operation 514). The 3D pose of the component can then be estimated based on the comparison result (operation 516). Note that the estimated pose is in the camera space.

Returning to FIG. 4, subsequent to determining/estimating the pose of the component, the robotic system can then convert the component pose from the camera space to the robot-base space using the transformation matrix derived during calibration (operation 408). In this example, it is assumed that the TCP pose of the gripper should be aligned with the component to facilitate the gripper picking up the component. Hence, the converted component pose can be the target pose of the gripper TCP. Based on the current pose of the gripper (which is in the robot-base space and known to the robotic controller) and the target pose, the robotic controller can determine a small step for moving the gripper (operation 410). Determine the small step can include computing an intermediate pose to move the gripper toward the target pose. For example, the intermediate pose may be on the direct path between the initial pose and target pose. The amount of displacement of the gripper in this small step can be equal to or smaller than a predetermined maximum displacement. The robotic controller can generate motion commands based on the determined small step and send the motion commands to the robotic arm (operation 412). The gripper moves accordingly to the intermediate pose (operation 414). After the movement of the gripper stops, the 3D machine-vision system estimates the pose of the gripper (operation 416) and determines if the gripper arrived at its target pose (operation 418). Note that a process similar to what is shown in FIG. 5 can be used to determine/estimate the pose of the gripper.

If the gripper has been moved to its target pose, the gripper can grasp the component (operation 420). Otherwise, the robotic controller can determine a next small step for moving the gripper (operation 410). Note that determining the next small step can include computing an intermediate pose of the component.

Subsequent to the gripper securely grasping the component, the robotic controller can move the gripper with the component to the vicinity of a mounting location for the component under the guidance of the 3D machine-vision system (422). As in operation 404, the 3D machine-vision system can operate at low resolution and the gripper with the component can be moved in a large step. The 3D machine-vision system can determine the pose of the mounting location in the camera space and convert such a pose to the robot-base space (operation 424). For example, if the grasped component is to mate with another component, the 3D machine-vision system can determine the pose of the other component. Based on the pose of the mounting location, the robotic system can determine the target mounting pose of the component held by the gripper (operation 426). The robotic controller can then move the component to its target mounting pose using a number of small-step movements (operation 428). At each small step, the 3D machine-vision system can determine the actual pose of the component in the camera space and convert the pose to the robot-base space. The robotic controller can then determine a small step to be taken to move the component toward its target pose. Once the component held by the gripper arrives at the target mounting pose, the robotic controller can control the gripper to mount and secure the component (operation 430).

In the example shown in FIG. 4, the component is mounted to a stationary location. In practice, it is also possible that two to-be-assembled components are held by two robotic arms. The two robotic arms can each move their end-effectors in small steps while determining the poses of both components at each step, until the two components can be aligned for assembly. In this case, both robotic arms move, similar to the way both hands of a human move in order to align the end of the thread with the hole of the needle when threading the needle.

To further improve the positioning accuracy, in some embodiments, it is also possible to compensate for the errors in the transformation matrix at each small step. In some embodiments, a trained machine-learning model (e.g., a neural network) can be used to generate an error matrix at any given location/pose in the 3D working space, and the error matrix can be used to corelate the camera-instructed pose of a component with a controller-desired pose. In other words, given the camera-instructed pose (or the target pose) as determined by the 3D machine-vision system, the system can compensate for the errors in the transformation matrix by having the robotic controller generate commands for the controller-desired pose. Detailed descriptions of compensating for errors in the transformation matrix can be found in co-pending U.S. application Ser. No. 17/751,228, entitled "SYSTEM AND METHOD FOR ERROR CORRECTION AND COMPENSATION FOR 3D EYE-TO-HAND COORDINATION," by inventors Sabarish Kuduwa Sivanath and Zheng Xu, filed 23 May 2022, the disclosure of which is incorporated herein by reference in its entirety for all purposes.

Figure 6:
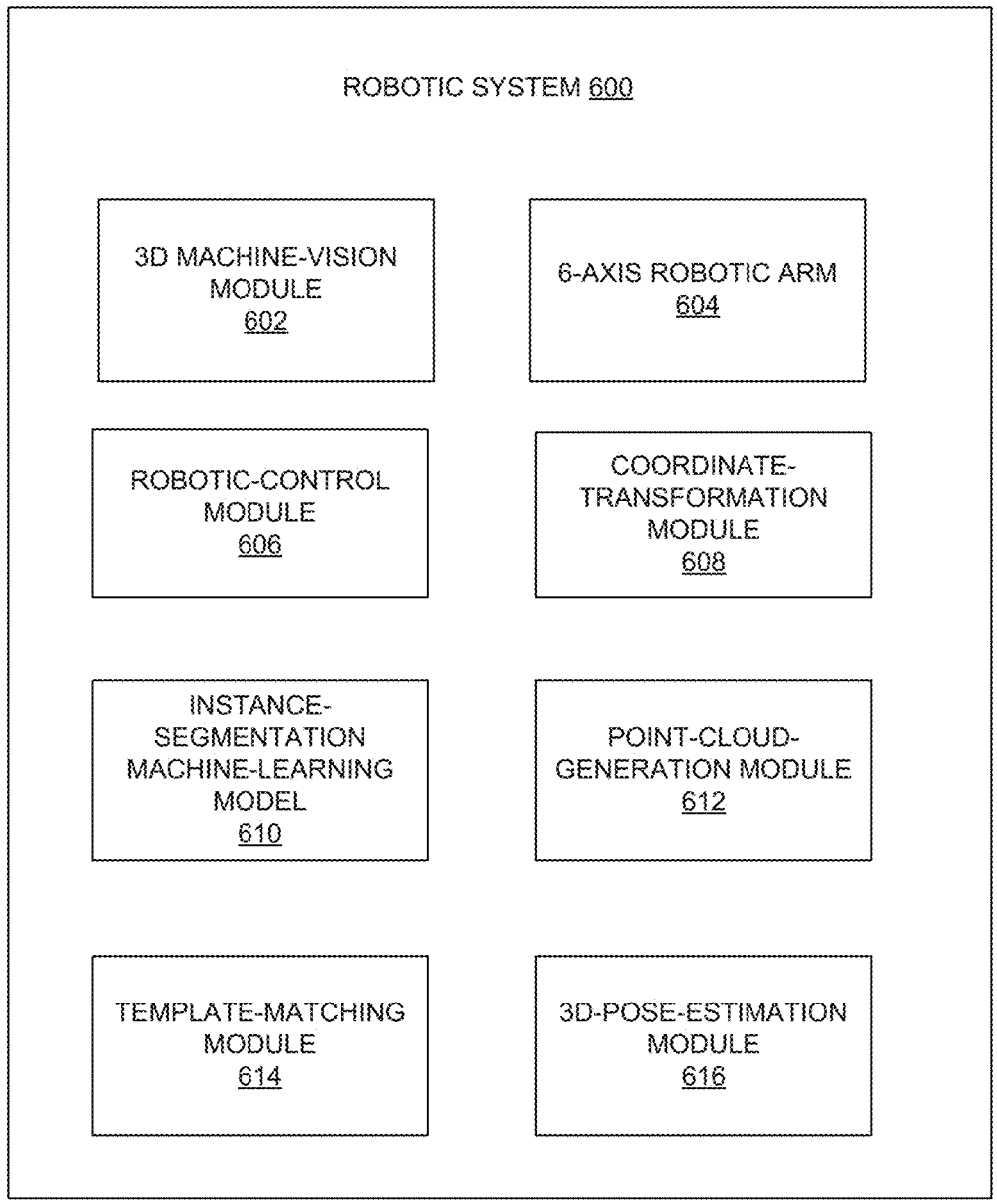
FIG. 6 shows a block diagram of an exemplary robotic system, according to one embodiment.

FIG. 6 shows a block diagram of an exemplary robotic system, according to one embodiment. Robotic system 600 can include a 3D machine-vision module 602, a six-axis robotic arm 604, a robotic-control module 606, a coordinate-transformation module 608, an instance-segmentation machine-learning model 610, a point-cloud-generation module 612, a template-matching module 614, and a 3D-pose-estimation module 616.

3D machine-vision module 602 can use 3D machine-vision techniques (e.g., capturing images under structured-light illumination, constructing 3D point cloud, etc.) to determine the 3D pose of objects (including both to-be-assembled components and the gripper) within the FOV and DOV of the cameras. In some embodiments, 3D machine-vision module 602 can include multiple cameras having different FOVs and DOVs and one or more structured-light projector.

Six-axis robotic arm 604 can have multiple joints and 6DoF. The end-effector of six-axis robotic arm 604 can move freely in the FOV and DOV of the cameras of 3D machine-vision module 602. In some embodiments, robotic arm 604 can include multiple sections, with adjacent sections coupled to each other via a rotational joint. Each rotational joint can include a servo motor capable of continuous rotation within a particular plane. The combination of the multiple rotational joints can enable robotic arm 604 to have an extensive range of movement with 6DoF.

Robotic-control module 606 controls the movements of robotic arm 604. Robotic-control module 606 can generate a motion plan, which can include a sequence of motion commands that can be sent to each individual motor in robotic arm 604 to facilitate movements of a gripper to accomplish particular assembling tasks, such as picking up a component, moving the component to a desired mounting location, and mounting the component. In some embodiments, robotic-control module 606 can be configured to confine each movement of the gripper to a small step, such that the displacement of each small step is equal to or less than a predetermined maximum displacement value. The maximum displacement value can be determined based on the desired level of positioning accuracy. A higher positioning accuracy means a smaller maximum displacement value for each small step.

Coordinate-transformation module 608 can be responsible for converting the pose of the gripper or component from the camera space to the robot-base space. Coordinate-transformation module 608 can maintain a transformation matrix and use the transformation matrix to transform a pose seen by 3D machine-vision module 602 in the camera space to a pose in the robot-base space. The transformation matrix can be obtained through a calibration process that measures multiple poses of a calibration target.

Instance-segmentation machine-learning model 610 applies a machine-learning technique to generate both a semantic map and instance centers for a captured image comprising multiple components. A mask for each object can be generated based on the output of instance-segmentation machine-learning model 610. Point-cloud-generation module 612 can be configured to generate a 3D point cloud for a to-be-assembled component. Template-matching module 614 can be configured to use a template-matching technique to compare surflet pairs of the 3D point cloud to surflet pairs of a 3D CAD model. 3D-pose-estimation module 616 can be configured to estimate the 3D pose of the to-be-assembled component based on the output of template-matching module 614.

Figure 7:
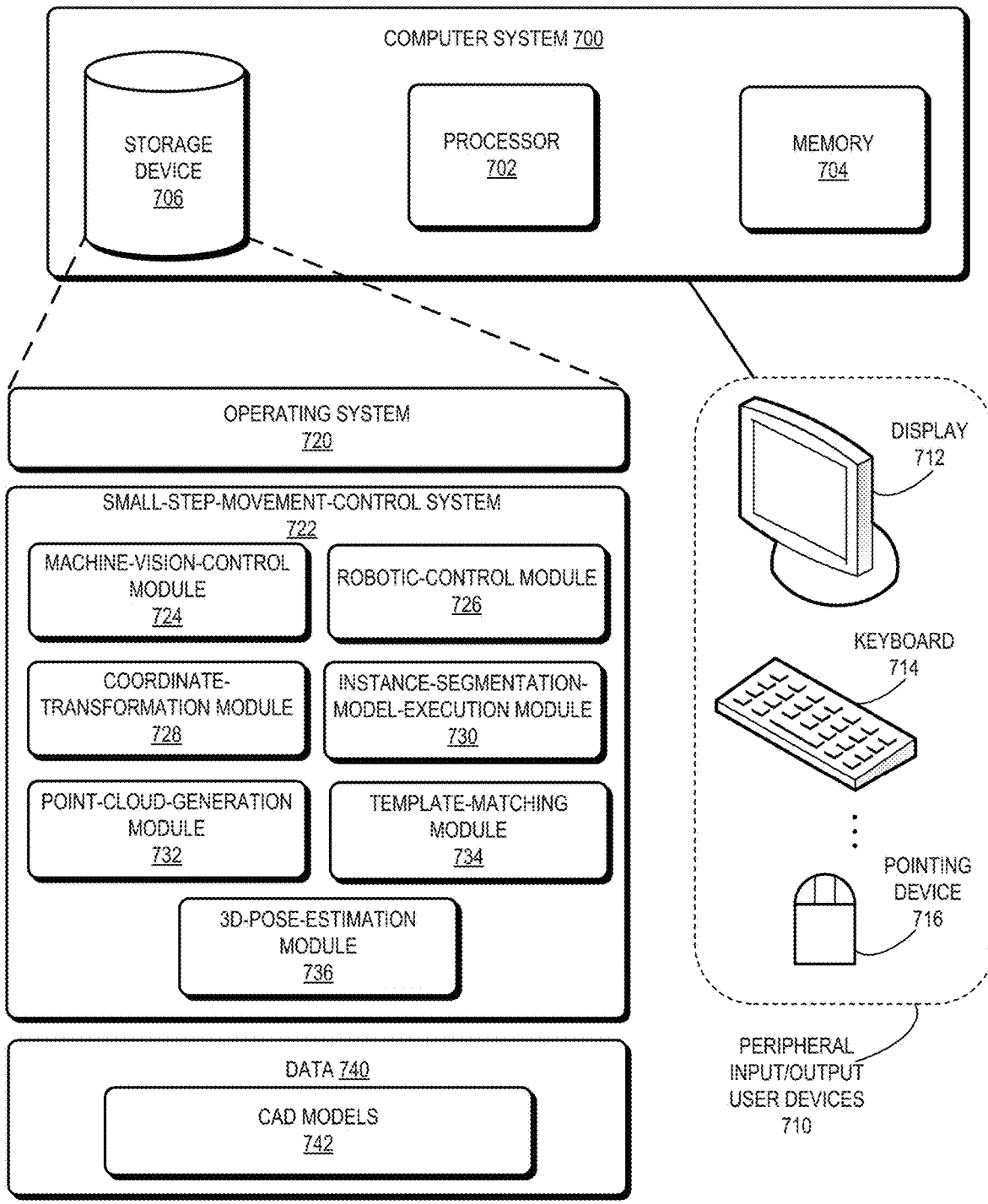
FIG. 7 illustrates an exemplary computer system that facilitates small-step movement in a robotic system, according to one embodiment.

FIG. 7 illustrates an exemplary computer system that facilitates small-step movement in a robotic system, according to one embodiment. Computer system 700 includes a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 720, a small-step-movement-control system 722, and data 740.

Small-step-movement-control system 722 can include instructions, which when executed by computer system 700, can cause computer system 700 or processor 702 to perform methods and/or processes described in this disclosure. Specifically, small-step-movement-control system 722 can include instructions for controlling a 3D machine-vision module to measure actual poses of the gripper (machine-vision-control module 724), instructions for controlling movements of the robotic arm in order to place the gripper in a particular pose (robotic-control module 726), instructions for transforming poses from the camera space to the robot-base space (coordinate-transformation module 728), instructions for executing an instance-segmentation machine-learning model to generate a mask for a to-be-assembled component in captured images of the working space (instance-segmentation-model-execution module 730), instructions for generating a 3D point cloud for the to-be-assembled component (point-cloud-generation module 732), instructions for applying a template-matching technique to compare surflet pairs of the 3D point cloud and a CAD model (template-matching module 734), and instructions for estimating the 3D pose of the to-be-assembled component (3D-pose-estimation module 736). Data 740 can include component CAD models 742.

In general, embodiments of the present invention can provide a system and method for detecting and compensating, in real time, for pose errors of a robotic system. The system can use machine-learning techniques (e.g., training a neural network) to predict an error matrix that can transform a camera-viewed pose (i.e., the instructed pose) to a controller-controlled pose (i.e., the desired pose). Therefore, to align the gripper with a component in the camera view, the system can first obtain the camera-viewed pose of the component and then use the trained neural network to predict the error matrix. By multiplying the camera-viewed pose with the error matrix, the system can obtain the controller-controlled pose. The robotic controller can then use the controller-controlled pose to move the gripper to the desired pose.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed.

When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A robotic system, the system comprising:
a machine-vision module;
a robotic arm comprising an end-effector; and
a robotic controller configured to control movements of the robotic arm to move a component held by the end-effector from an initial pose to a target pose;
wherein, while controlling the movements of the robotic arm, the robotic controller is configured to move the component in a plurality of steps; and
wherein, at each step, the machine-vision module is configured to:
capture images of the robotic arm,
generate a three-dimensional (3D) point cloud based on the captured images of the end-effector and component, and
determine a current pose of the component by comparing surflet pairs associated with the 3D point cloud and surflet pairs associated with a computer-aided design (CAD) model of the component; and
wherein displacement of the component in each step is less than or equal to a predetermined maximum displacement value.

2. The robotic system of claim 1, wherein the robotic controller is configured to determine a next step based on the current pose and the target pose of the component.

3. The robotic system of claim 1, wherein the machine-vision module comprises a plurality of cameras and one or more structured-light projectors, and wherein the cameras are configured to capture images of a working space of the robotic arm under illumination of the structured-light projectors.

4. The robotic system of claim 1, wherein the machine-vision module is further configured to transform the current pose from a camera-centered coordinate system to a robot-centered coordinate system.

5. The robotic system of claim 4, wherein the coordinate-transformation module is further configured to determine a transformation matrix based on a predetermined number of measured poses of a calibration target.

6. The robotic system of claim 1, wherein the predetermined maximum displacement value is determined based on a level of required positioning accuracy of the robotic system.

7. A computer-implemented method for controlling movements of a robotic arm comprising an end-effector, the method comprising:
determining a target pose of a component held by the end-effector; and
controlling, by a robotic controller, movements of the robotic arm to move the component from an initial pose to the target pose in a plurality of steps, wherein displacement of the component in each step is less than or equal to a predetermined maximum displacement value;
wherein controlling the movements of the robotic arm comprise determining, by a machine-vision module, a current pose of the component after each step; and
wherein determining the current pose of the component comprises generating a three-dimensional (3D) point cloud based on images captured by the machine-vision module and comparing surflet pairs associated with the 3D point cloud and surflet pairs associated with a computer-aided design (CAD) model of the component.

8. The method of claim 7, further comprising:
determining, by a robotic controller, a next step based on the current pose and the target pose of the component.

9. The method of claim 7, further comprising capturing images of a working space of the robotic arm under illumination of one or more structured-light projectors.

10. The method of claim 7, further comprising transforming a pose determined by the machine-vision module from a camera-centered coordinate system to a robot-centered coordinate system.

11. The method of claim 10, further comprising determining a transformation matrix based on a predetermined number of poses of a calibration target measured by the machine-vision module.

12. The method of claim 7, wherein the predetermined maximum displacement value is determined based on a level of required positioning accuracy of the robotic system.

* * * * *